US012131280B2

(12) United States Patent
Sharma et al.

(10) Patent No.: US 12,131,280 B2
(45) Date of Patent: *Oct. 29, 2024

(54) SYSTEMS AND METHODS FOR SYNCHRONIZING PROCESSING STATEMENT DEPLOYMENT ACROSS DIVERSE COMPUTER NETWORKS USING A THREE-TIERED ARTIFICIAL INTELLIGENCE ARCHITECTURE

(71) Applicant: Citibank, N.A., New York, NY (US)

(72) Inventors: Maneet Sharma, Irving, TX (US);
Flora Sah, Natick, MA (US); Adar Kiran Danait, Flower Mound, TX (US); Ashima Gupta, Coppell, TX (US); James Iacona, Yardley, PA (US); Crystal Lynn Magruder, Eolia, MO (US); Tracy L. Yager, Wright City, MO (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/361,250

(22) Filed: Jul. 28, 2023

(65) Prior Publication Data
US 2024/0330818 A1 Oct. 3, 2024

Related U.S. Application Data

(63) Continuation of application No. 18/190,602, filed on Mar. 27, 2023, now Pat. No. 11,763,236.

(51) Int. Cl.
*G06Q 10/0635* (2023.01)
*G06F 40/44* (2020.01)
(52) U.S. Cl.
CPC ......... *G06Q 10/0635* (2013.01); *G06F 40/44* (2020.01)

(58) Field of Classification Search
CPC ............................ G06Q 10/0635; G06F 40/44
See application file for complete search history.

(56) References Cited

U.S. PATENT DOCUMENTS 11,036,866 B2 * 6/2021 Iyer ..................... G06F 11/0796
11,128,653 B1 * 9/2021 Tkachuk ................. H04L 41/12
(Continued)

FOREIGN PATENT DOCUMENTS

| CN | 113032544 A | 6/2021 |
| CN | 115328937 A | 11/2022 |

OTHER PUBLICATIONS

Foreign Search Report on PCT Dtd Jul. 19, 2024.

*Primary Examiner* — Etienne P Leroux
(74) *Attorney, Agent, or Firm* — Foley & Lardner LLP

(57) ABSTRACT

Systems and methods are described for a three-tiered artificial intelligence architecture that synchronizes processing statement deployment across diverse computer networks. The system may receive, at a user interface, a first request for a first recommendation. The first recommendation includes a set of standardized processing statements for implementing on a function. The system may input the first request into a first network component. The first network component includes first, second, and third models. The first model is trained to generate a library of standardized processing statements. The second model is trained to generate a plurality of standardized processing characteristic values for each standardized processing statement in the library. The third model is trained to generate recommendations of sets of standardized processing statements to functions. The system receives an output from the first network component and generates for display the first recommendation based on the output.

20 Claims, 9 Drawing Sheets

(56) References Cited

U.S. PATENT DOCUMENTS 11,763,236 B1 9/2023 Sharma et al.
2022/0359045 A1* 11/2022 Manica ................ G06F 16/355

* cited by examiner

FIG. 1A

SYSTEMS AND METHODS FOR SYNCHRONIZING PROCESSING STATEMENT DEPLOYMENT ACROSS DIVERSE COMPUTER NETWORKS USING A THREE-TIERED ARTIFICIAL INTELLIGENCE ARCHITECTURE

CROSS-REFERENCE TO RELATED APPLICATION(S)

This application is a continuation of U.S. patent application Ser. No. 18/190,602, filed Mar. 27, 2023, now U.S. Pat. No. 11,763,236. The content of the foregoing application is incorporated herein in its entirety by reference.

BACKGROUND

Artificial intelligence, including, but not limited to, machine learning, deep learning, etc. (referred to collectively herein as artificial intelligence models, machine learning models, or simply models), has excited the imaginations of both industry enthusiasts as well as the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless.

However, despite these benefits and despite the wide-ranging number of potential uses, practical implementations of artificial intelligence have been hindered by several technical problems. For example, artificial intelligence typically relies on training a model to make predictions and/or perform functions. Such training requires large amounts of high-quality labeled data through which historical patterns may be detected. The process for obtaining this data and ensuring it is high-quality is often complex and time-consuming. This is particularly difficult in instances where there is no existing labeled data and/or no consensus on what an appropriate label for existing data should be. These technical problems present an inherent problem with attempting to use an artificial intelligence-based solution in determining, aggregating, and/or deploying processing statements related to Activity, Risk, Control, and Monitoring ("ARCM") tools.

SUMMARY

Methods and systems are described herein for novel uses and/or improvements to artificial intelligence applications. As one example, systems and methods are described herein for a novel three-tiered artificial intelligence architecture with improved performance in environments with no existing labeled data and/or no consensus on what an appropriate label for existing data should be. In particular, systems and methods are described herein for synchronizing processing statement deployment (e.g., data for which no existing labeled data and/or no consensus on what an appropriate label for existing data should be) across diverse computer networks (e.g., networks implementing ARCM tools).

For example, increasingly, entities (e.g., a business, domain, user group, etc.) are composed of, or represented by, a plurality of computer networks, each of which may serve a different purpose and/or function. The entity may wish to apply an ARCM tool to conform activity performed on the network, identify potential risks to the network, implement controls to the network, and/or monitor the controls that are applied to the network (e.g., referred to collectively herein as "processing functions"). However, each of these processing functions may be specific to an entity, a function, and/or a specific function that is itself specific to an entity. Furthermore, generating data describing these processing functions would require manually reading and evaluating hundreds of thousands of processing descriptions to assess for completeness, which is not only impossible but is also subjective and not standardized. Thus, there is no standardization and/or synchronization across an entity, function, etc., for how a given processing statement (e.g., a description of one or more processing characteristics of a processing function) should be created and/or deployed.

One solution for achieving a standardization and/or synchronization for an entity, a function, and/or a specific function that is itself specific to an entity may be through the use of an artificial intelligence-based solution. However, as noted above, there is no existing labeled data upon which to base a standardization and/or synchronization of different processing functions and/or no consensus on how to create an appropriate label for existing data. Thus, when attempting to apply an artificial intelligence-based solution in this environment, this novel technical challenge must be overcome.

To overcome this novel technical challenge, systems and methods are disclosed herein for a three-tiered artificial intelligence architecture. Notably, in addition to overcoming the novel technical challenge described above, the use of the three-tiered artificial intelligence architecture is also for a granular approach that provides more accuracy and precision. For example, the three-tiered artificial intelligence architecture uses three models, each of which is independently trained on different datasets and trained to produce different determinations. The outputs of the three models may then be used in concert to generate recommendations for standardized and/or synchronized processing statement deployment across an entity, function, etc. Notably, the three-tiered artificial intelligence architecture provides the additional technical benefit of allowing each model to be independently optimized, updated, and/or retrained. Accordingly, the three-tiered artificial intelligence architecture allows for a modular and/or scalable architecture that may be compatible with a diverse suite of entities, functions, and/or specific functions that are specific to one or more entities.

As such, the three-tiered artificial intelligence architecture may include a first model that is trained to generate standardized processing statements for a given entity and/or function. The first model may be trained to use natural-language processing to identify, categorize, and/or deduplicate non-standardized processing statements based on one or more non-standardized processing characteristics in non-standardized descriptions of the non-standardized processing statements. The first model may then output a standardized set of processing statements that may populate a library of standardized processing statements for deployment for a given entity and/or function. By doing so, the given entity and/or function may not only achieve a standardized set of processing statements for deployment but may continuously update the available standardized processing statements as new entities, functions, etc. are created and/or removed.

The three-tiered artificial intelligence architecture may also include a second model that is trained to generate standardized processing characteristic values for each standardized processing statement in the library of standardized processing statements. For example, the second model may be trained to identify processing characteristics in standardized processing statements and determine standardized processing characteristic values for the identified processing characteristics. The second model may then output a standardized set of processing characteristic values that may populate the processing statements in the library of standardized processing statements. By doing so, the processing characteristic values may not only be standardized across the given entity and/or function but also may be dynamically updated as new requirements and/or goals for processing characteristic values are determined and/or implemented. Furthermore, as the second model is independent of the first and third, the updates may be instituted without affecting the standardized set of processing statements determined by the first model or the determinations of functions (or entities) to which the processing statements apply.

Finally, the three-tiered artificial intelligence architecture may include a third model that is trained to generate recommendations that synchronize the functions across a network to which the standardized processing statements, featuring the standardized processing characteristics, are applied. For example, the third model may be trained to identify (e.g., within a given confidence level) one or more functions to which a standardized processing statement applies based on a function taxonomy. That is, the third model may receive a function taxonomy (e.g., describing function characteristics of one or more functions) and standardized processing characteristics for one or more processing statements and determine a likelihood that a given standardized processing statement in the library corresponds to a given function. By doing so, the system may synchronize the functions to which one or more standardized processing statements are deployed. This synchronization may also be dynamically updated as new functions, processing statements in the standardized library, and/or the function taxonomy is updated. Furthermore, as the third model is independent of the first and second, the updates may be instituted without affecting how the standardized set of processing statements, processing characteristics, and/or values thereof are modified.

In some aspects, systems and methods are described for a three-tiered artificial intelligence architecture that synchronizes processing statement deployment across diverse computer networks. The system may receive, at a user interface, a first request for a first recommendation, wherein the first recommendation comprises a first set of standardized processing statements for implementing on a first function of a plurality of functions for a network. The system may input the first request into a first network component, wherein the first network component comprises a first model, a second model, and a third model. The first model may be trained to generate a library of standardized processing statements for the plurality of functions based on similarities in non-standardized processing characteristics in non-standardized descriptions of non-standardized processing statements. The second model may be trained to generate a plurality of standardized processing characteristic values for each standardized processing statement in the library. The third model is trained to generate recommendations of sets of standardized processing statements applied to one or more of the plurality of functions. The system may receive a first output from the first network component and generate for display, on the user interface, the first recommendation based on the first output.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

Figure 1A:
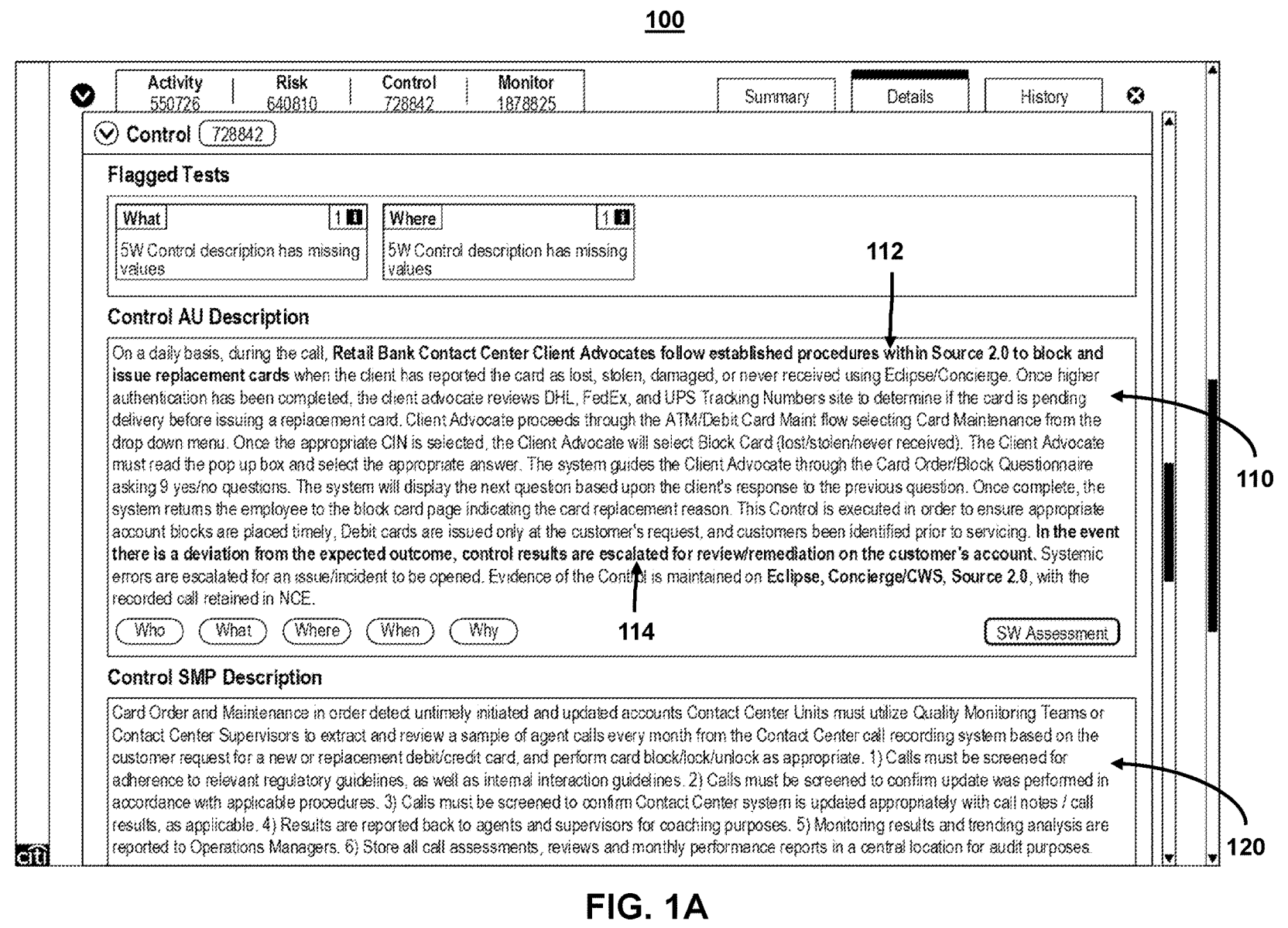

FIGS. 1A-C show an illustrative diagram for synchronizing processing statement deployment with a three-tiered artificial intelligence architecture, in accordance with one or more embodiments.

DETAILED DESCRIPTION OF THE DRAWINGS

Figure 1B:
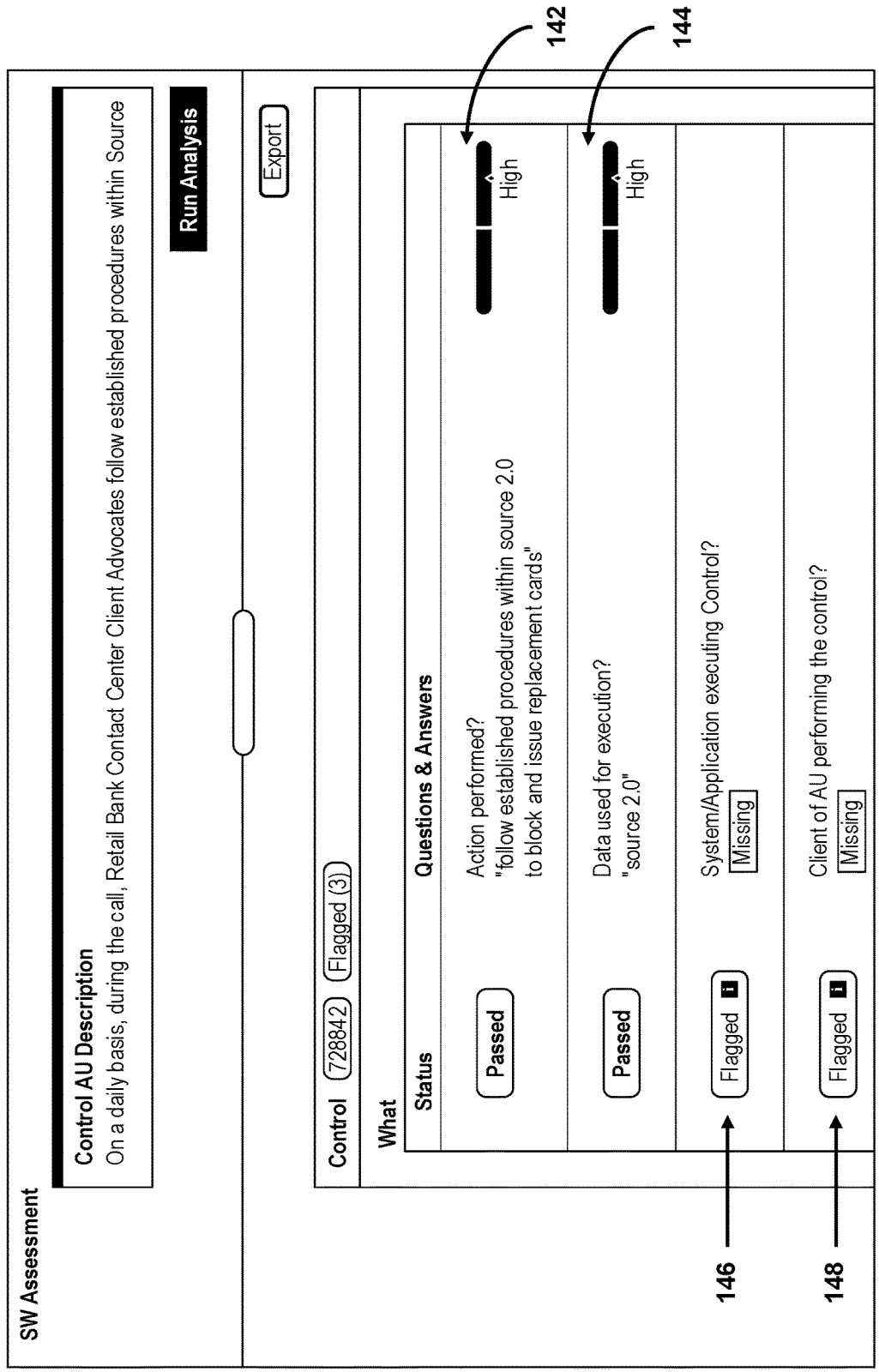

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1A shows an illustrative diagram for receiving non-standardized processing statements in connection with a request for a recommendation of a first set of standardized processing statements for implementing on a first function, in accordance with one or more embodiments. For example, user interface 100 shows non-standardized processing statement 110 and non-standardized processing statement 120 as received by the system. For example, the system may receive a request for a set of standardized processing statements that correspond to one or more functions (e.g., business processes) of a given entity. The processing statements may comprise information used for basic information-gathering. For example, the processing statement may comprise answers to who (e.g., what function, entity, system, etc.) a statement applies, what conditions (e.g., as defined by one or more processing characteristics and/or values thereof) are required by the statement, when or where the conditions apply (e.g., in terms of functions, entities, components, etc. that are subject to the statement as well as geographic, temporal, and/or other restrictions used to identify a subset of functions, entities, components, etc.), and/or why a statement exist (e.g., a description of the importance, role, and/or rationale for the statement). In some embodiments, the system may extract one or more features (e.g., the processing characteristics discussed above) from the text of descriptions of non-standardized processing statements. The system may extract these features using one or more of the models described below with FIGS. 2A-2C. The features may correspond to one or more of the who, what, when, where, and why of a processing statement. For example, feature 112 is a "what" of the processing statement 110 shown in user interface 100. It corresponds to this portion of text within the processing statement: "follow established procedures within Source 2.0 to block and issue replacement cards". Feature 112 captures the processing statement's prescription for an action the function is to perform under certain conditions. Similarly, feature 114 is a "what" of processing statement 110.

A processing statement may be associated with one or more functions, and the processing statements may be used to define and control the behavior of the functions in certain contexts. For example, a function may describe an action taken by an entity, component, etc., which may comprise a business process performed by a network (which may itself comprise and/or correspond to an entity, component, etc.). Processing statements may place limits on functions, defining the scope and applicability of functions. A function may correspond to a multitude of processing statements, each imposing a conditional limitation on the function.

FIG. 1B shows a user interface 140 for displaying a recommendation to a user of the system. The recommendation includes a set of processing statements that may be applied to the function. In particular, processing statement 142 and processing statement 144 are shown as being recommended to correspond to the function. The system may use the three-tiered artificial intelligence architecture to select the processing statements for a recommendation regarding the function, as described below. The processing statements and confidence levels, in addition to the likelihoods of correspondence between the processing statements and the function, may be the output of the third model. The system in this example is confident regarding the two processing statements (processing statement 142 and processing statement 144) in the recommendation. The system displays confidence levels to the right of the substance of the processing statements, indicating that the levels of confidence are high. The system may flag the absence of certain processing statements, e.g., processing statement 146 and processing statement 148. The system may be unable to identify non-standardized processing statements in the descriptions provided by the user that corresponds to any selections of processing statement 146 and processing statement 148. Consequently, the system recommends no processing statement for the missing features. In some embodiments, the system may require the user to re-submit descriptions such that the absent processing statements may be recommended.

Figure 1C:
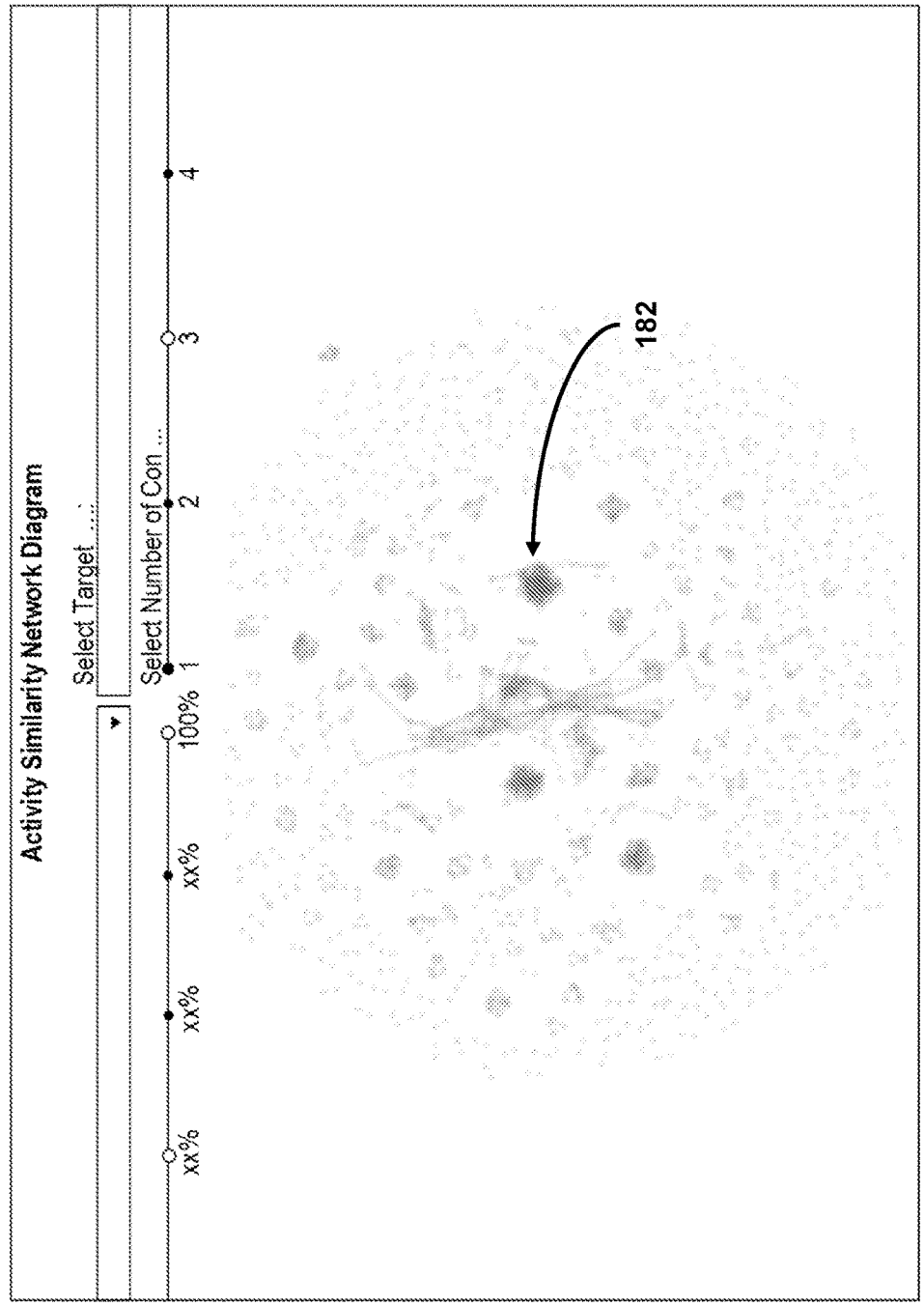

FIG. 1C shows an example cluster graph, as may be used by a first model in the three-tiered artificial intelligence architecture. For example, portions of text within non-standardized processing statements may be represented as vectors or matrices of real values. The real values may be shown in a real-valued space, such as the one shown for cluster graph 180. Each data point given as input to the first model may be represented as a vector or matrix of real values. Using the vectors and matrices, the first model may determine distance measures (e.g., cosine similarities) between vectors or matrices for use with a distance-based clustering algorithm. The distance-based clustering algorithm used by the first model may be one of K-means clustering, hierarchical clustering. DBSCAN, or mean shift clustering. In some embodiments, groups of vectors or matrices for which the distance from any vector or matrix to any other vector or matrix falls within a distance threshold may be defined to be a standard cluster. On cluster graph 180, cluster 182 is one such standard cluster. In some embodiments, each standard cluster may be collapsed into a single point at the center of the standard cluster. The point, which may be referred to as a standard archetype, may represent a vector or matrix of non-standardized processing characteristics for non-standardized processing statements in the standard cluster. In some embodiments, the standard archetype for a standard cluster may be computed by taking distance-weighted averages of non-standardized processing characteristics in that cluster. For each standard cluster, the standard processing characteristics of the standard archetype may be used to select or define a standardized processing statement corresponding to that standard cluster.

Figure 2A:
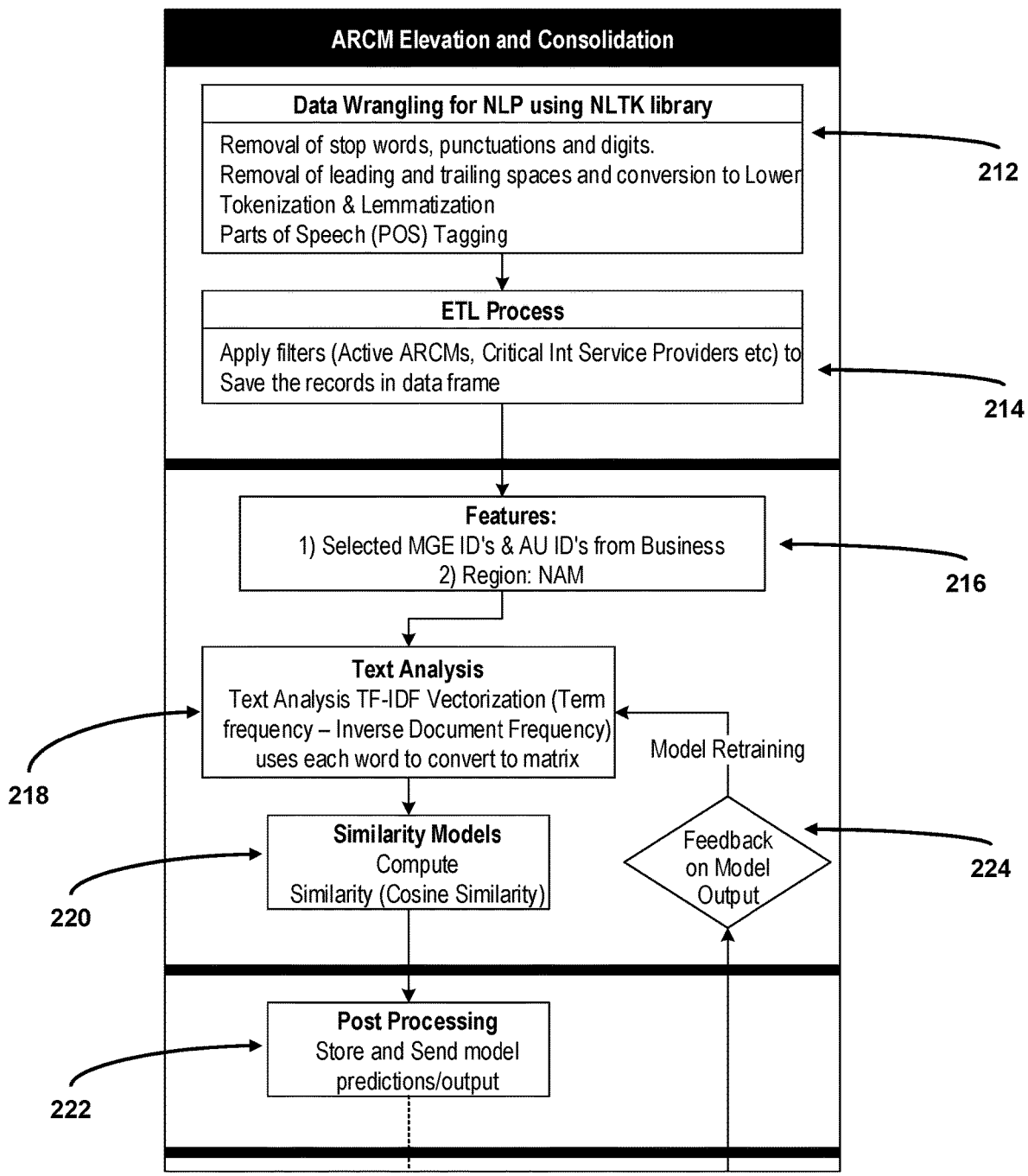
FIGS. 2A-C show illustrative diagrams for a three-tiered artificial intelligence architecture for synchronizing processing statement deployment, in accordance with one or more embodiments.
Figure 2B:
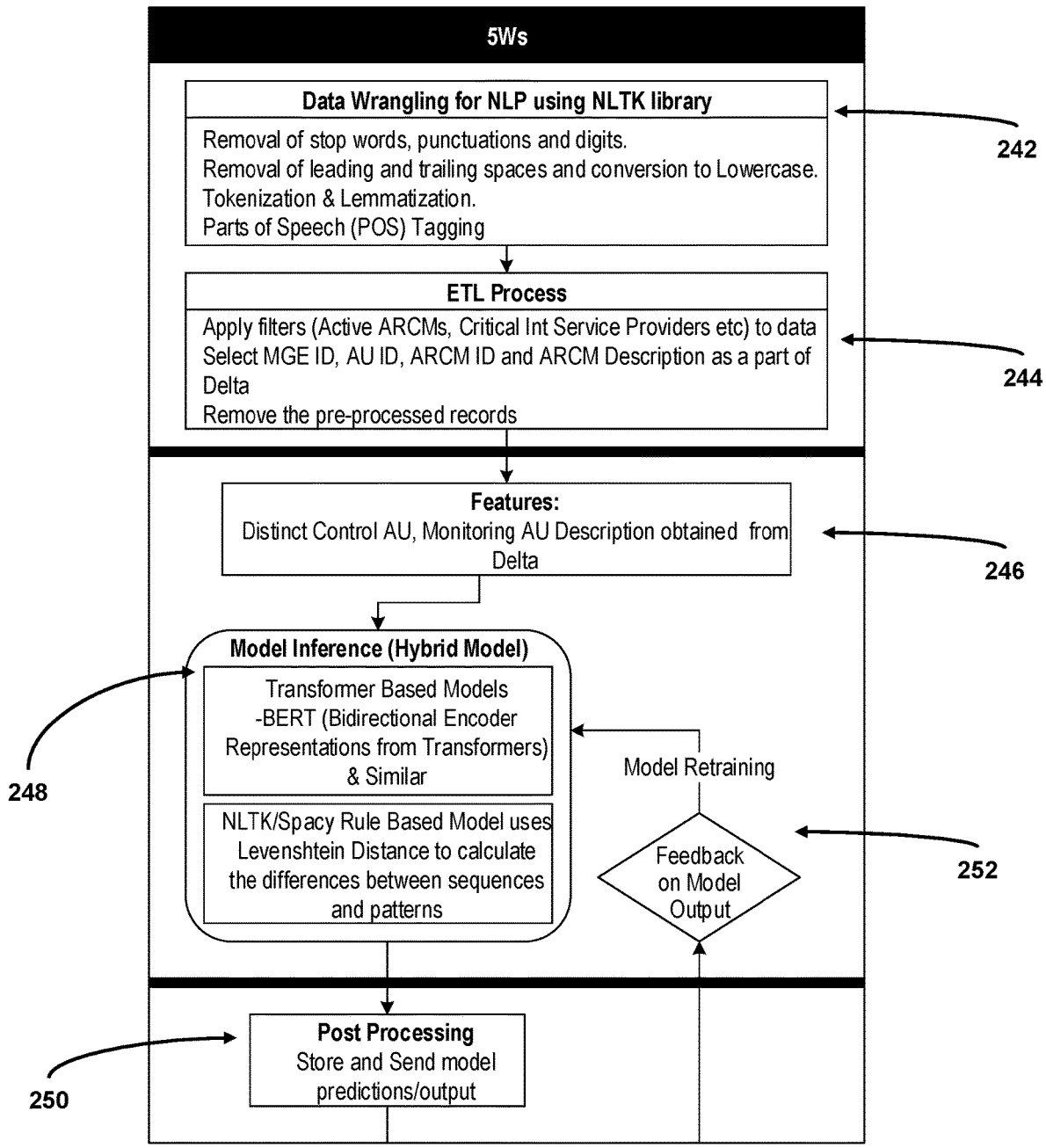
Figure 2C:
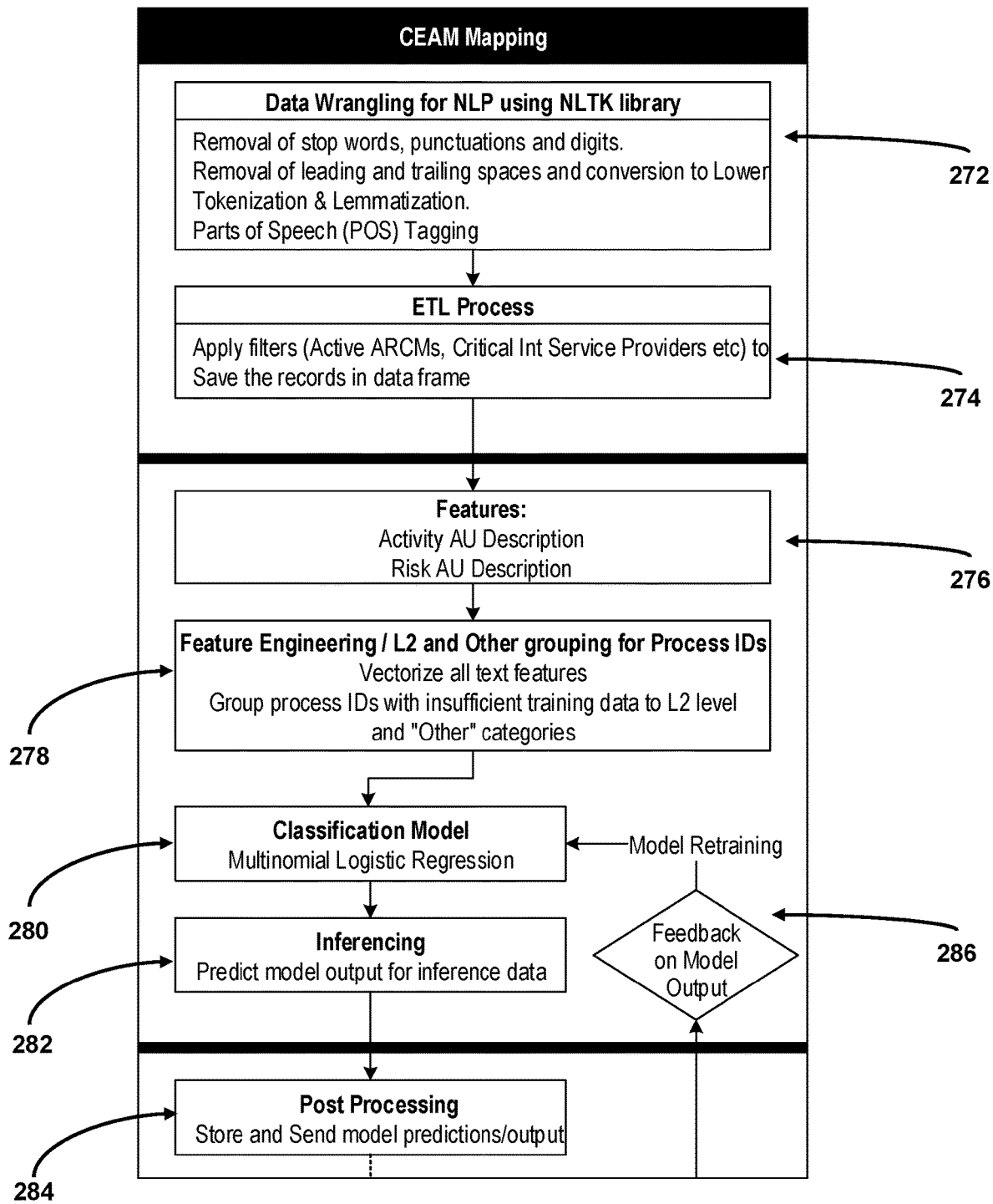

FIGS. 2A-2C show illustrative diagrams for the three-tiered artificial intelligence architecture for synchronizing processing statement deployment. Specifically, FIG. 2A shows an exemplary first model, FIG. 2B shows an exemplary second model, and FIG. 2C shows an exemplary third model.

The first model may be trained to use natural-language processing to identify, categorize, and/or deduplicate non-standardized processing statements based on one or more non-standardized processing characteristics in non-standardized descriptions of the non-standardized processing statements. The first model may then output a standardized set of processing statements that may populate a library of standardized processing statements for deployment for a given entity and/or function. By doing so, the given entity and/or function may not only achieve a standardized set of processing statements for deployment but may continuously update the available standardized processing statements as new entities, functions, etc. are created and/or removed. The system may train and deploy the first model in a series of steps as illustrated by diagram 210.

At step 212, the system performs data cleaning and data engineering, for example, using the NLTK programming library. For example, a first data cleaning process may remove stop words, punctuations, and digits from non-standardized descriptions of non-standardized processing statements. For example, a second data cleaning process removes trailing and leading spaces and converts to lowercase all alphanumeric characters; a third data cleaning process lemmatizes each word in non-standardized descriptions of non-standardized processing statements to a root form, and a fourth performs part-of-speech tagging to each word in non-standardized descriptions of non-standardized processing statements. After applying the data cleaning processes to non-standardized descriptions of non-standardized processing statements, the system may generate a set of cleaned non-standardized processing statements.

At step 214, the system may extract, translate, and load the set of cleaned non-standardized processing statements. For example, the system may extract text segments from the set of cleaned non-standardized processing statements to enforce data type standards, data validity standards, and structural conformity of the data. By doing so, the system may standardize the data to remove outliers and reduce the frequency of null entries to provide higher-quality training data to the first model.

At step 216, the system may select features from the data that is cleaned and processed. The features may be of particular note, depending on the data format and the functions to which standardized processing statements may be paired. For example, a particular alphanumeric string occurring at a particular portion of non-standardized descriptions of non-standardized processing statements may symbolize an identification number corresponding to some entity or function. That alphanumeric string may hence be selected as a feature.

At step 218, the system may derive numerical representations of words, phrases, or sentences in non-standardized descriptions of non-standardized processing statements. For example, the system may use the TF-IDF (term frequency-inverse document frequency) method to symbolize the frequency of occurrence of words and phrases. The system may encode non-standardized descriptions of non-standardized processing statements with such frequencies.

At step 220, using data processed with the above preprocessing steps, the system may train the first model. The first model may be trained to generate a library of standardized processing statements for the plurality of functions based on similarities in non-standardized processing characteristics in non-standardized descriptions of non-standardized processing statements. In order to generate the library of standardized processing statements, the first model may determine distance measures (e.g., cosine similarities) of text of the non-standardized processing characteristics in the non-standardized descriptions of non-standardized processing statements. For example, similar or identical portions of text in the non-standardized descriptions of non-standardized processing statements may be assigned smaller distance measures than portions of text with larger discrepancies. Then, using a distance-based clustering algorithm on the cosine similarities of text of the non-standardized processing characteristics, the first model may cluster the non-standardized processing characteristics into a plurality of standard clusters. Each standard cluster contains non-standardized processing characteristics with similar text descriptions, thus indicating that the underlying non-standardized processing statements may be the same or sufficiently similar such that they may be grouped into the same standardized processing statement. The distance-based clustering algorithm used by the first model may be one of K-means clustering, hierarchical clustering. DBSCAN, or mean shift clustering. In some embodiments, each standard cluster may be collapsed into a single point at the center of the standard cluster. The point, which may be referred to as a standard archetype, may represent non-standardized processing characteristics for all non-standardized processing statements in the standard cluster. In some embodiments, the standard archetype for a standard cluster may be computed by taking distance-weighted averages of non-standardized processing characteristics in that cluster. For each standard cluster, the standard processing characteristics of the standard archetype may be used to select a standardized processing statement corresponding to that standard cluster. For example, for each cluster in the plurality of standard clusters, the first model may select a standardized processing statement to be a non-standardized processing statement whose non-standardized processing characteristics are closest to the standard archetype of that cluster. Thus, the first model may generate a library of standardized processing statements for the plurality of functions. Functions within the plurality of functions may be labeled with one or more standardized processing statements from the library, e.g., using the second and third models. By combining non-standardized processing statements into standardized processing statements using clustering of non-standardized processing characteristics, the system reduces redundancy in data, increases uniformity, and creates more accurate predictions in downstream tasks.

At step 222, the first model may be post-processed after training. For example, the system may compute a test error of the first model on test data distinct from training data. Alternatively or additionally, the system may compute a cross-validation error rate. The system may store any weights or parameter values for any algorithms used by the first model. In some embodiments, the system may store specifications regarding the first model, such as hyperparameters used while training or the relative explanative values of features in the first model.

At step 224, the system may retrain the first model, for example in response to additional data. For example, the system may receive retraining data including a new set of non-standardized processing statements, possibly having a different format than the first set. The system may repeat the above preprocessing and training steps (e.g., step 211 through 216) on the new set. Model weights and parameter values of the retrained first model may be stored alongside or instead of that of the original first model. In some embodiments, the system may determine to retrain the first model by when the test error and/or cross-validation error exceed a threshold.

The second model may be trained to identify processing characteristics in standardized processing statements and determine standardized processing characteristic values for the identified processing characteristics. The second model may then output a standardized set of processing characteristic values that may populate the processing statements in the library of standardized processing statements. By doing so, the processing characteristic values may not only be standardized across the given entity and/or function but also may be dynamically updated as new requirements and/or goals for processing characteristic values are determined and/or implemented. Furthermore, as the second model is independent of the first and third, the updates may be instituted without affecting the standardized set of processing statements determined by the first model or the determinations of functions (or entities) to which the processing statements apply.

At step 242, similarly to step 212, the system performs data cleaning and data engineering, for example, using the NLTK programming library. For example, a first data cleaning process may remove stop words, punctuations, and digits from non-standardized descriptions of standardized processing statements. For example, a second data cleaning process removes trailing and leading spaces and converts to lowercase all alphanumeric characters; a third data cleaning process lemmatizes each word in non-standardized descriptions of non-standardized processing statements to a root form, and a fourth performs part-of-speech tagging to each word in standardized descriptions of non-standardized processing statements.

At step 244, similarly to step 214, the system may extract, translate, and load the set of cleaned standardized processing statements. For example, the system may extract text segments from the set of cleaned standardized processing statements to enforce data type standards, data validity standards, and structural conformity of the data. By doing so, the system may standardize the data to remove outliers and reduce the frequency of null entries to provide higher-quality training data to the first model.

At step 246, similarly to step 216, the system may select features from the data that is cleaned and processed. The features may be of particular note, depending on the data format and the functions to which standardized processing statements may be paired. For example, a particular alphanumeric string occurring at a particular portion of non-standardized descriptions of non-standardized processing statements may symbolize an identification number corresponding to some entity or function. That alphanumeric string may hence be selected as a feature.

At step 248, using data processed with the above preprocessing steps, the system may train the second model. The second model may be trained to generate a plurality of standardized processing characteristic values for each standardized processing statement in the library. For example, the system may generate a feature input for the second model based on each standardized processing statement in the library. A feature input may correspond to or include a plurality of text segments. Each text segment in the plurality of text segments comprises one or more words and punctuation marks in a standardized processing statement in the library. Using the text segments, the system may generate text paragraphs. Each text paragraph comprises one or more words, sentences, and punctuation marks in a standardized processing statement in the library. That is, the system may divide text in the descriptions of standardized processing statements into portions of varying sizes. The system may then string together the portions of text in sequence and generate the feature input for the second model to include text segments and text paragraphs. By preparing the feature input of the second model this way, the system allows the second model to make use of contextual cues as well as standalone interpretations within the text data and achieve a more accurate embedding for words, phrases, and sentences.

The second model may input the feature input into a transformer-based model and/or a natural language processing model. The natural language processing model may use Levenshtein Distance or other distance metrics to calculate differences between one or more sequences and patterns of text in standardized processing statements. In some embodiments, the natural language processing model may be a rule-based model like the NLTK library. For example, the natural language processing model may perform preprocessing for the transformer-based model. The transformer-based model may, for example, be a Bidirectional Encoder Representations from Transformers (BERT) model or another language model. The system may receive as output from the transformer-based model and/or the natural language processing model a plurality of text representations for standardized processing statements. A text representation may be a vector of real values corresponding to a segment of text (e.g., the feature input to the transformer-based model and/or a natural language processing model). Each standardized processing statement may correspond to one or more text representations. Using the plurality of text representations, the second model may generate a plurality of standardized processing characteristic values for each standardized processing statement in the library. The standardized processing characteristic values may include a list of text representations corresponding to the standardized processing statement, as generated by the second model. By using text representations to inform standardized processing characteristic values, the second model provides a uniform and informative method for comparing standardized processing statements.

At step 250, the second model may be post-processed, similarly to step 222. At step 252, the second model may be retrained, similarly to step 224. During retraining, the feature input may be retrained to select a different set of features. Consequently, the retrained second model may produce text representations different from the original second model when given the same standardized processing statement.

The third model may be trained to identify (e.g., within a given confidence level) one or more functions to which a standardized processing statement applies based on a function taxonomy. That is, the third model may receive a function taxonomy (e.g., describing function characteristics of one or more functions) and standardized processing characteristics for one or more processing statements and determine a likelihood that a given standardized processing statement in the library corresponds to a given function. By doing so, the system may synchronize the functions to which one or more standardized processing statements are deployed. This synchronization may also be dynamically updated as new functions, processing statements in the standardized library, and/or the function taxonomy is updated. Furthermore, as the third model is independent of the first and second, the updates may be instituted without affecting how the standardized set of processing statements, processing characteristics, and/or values thereof are modified. Steps 272, 274, and 276 are data preprocessing steps, respectively, corresponding to and using the same processes as steps 212, 214, and 216. At step 278, the system may perform additional feature engineering. For example, the system may vectorize all text features by converting paragraphs and sentences to sequences of words and other text tokens. In addition, certain portions of the feature input to the third model may be categorized. For example, the density of non-standardized processing statements approximating each standardized processing statement may be a quantitative variable categorized into a binary "sufficient" category and an "insufficient" category, represented by 1 and 0, respectively.

At step 280, the system trains the third model. The third model is trained to generate recommendations of sets of standardized processing statements applied to one or more of the plurality of functions. For example, the system may generate a feature input for the third model based on each standardized processing statement in the library (e.g., as generated by the first model). In some embodiments, the feature input corresponding to a standardized processing statement in the library may include the text representations as generated by the second model. The third model may then input the feature input into a classification model (e.g., a multinomial logistic regression algorithm) to receive as output a plurality of category assignments. Each standardized processing statement in the library may be assigned with one or more categories from a set of categories. The third model may correspondingly generate an equivalence map from the set of categories to the plurality of functions. The equivalence map may be used in two directions: for a given function, the equivalence map may output the set of categories the function is assigned to; for a given category, the equivalence map may output the set of functions to which the category has been assigned. By doing so, the system may synchronize the functions to which one or more standardized processing statements are deployed. This synchronization may also be dynamically updated as new functions, processing statements in the standardized library, and/or the function taxonomy is updated.

In some embodiments, the third model may instead process the function to extract identifying features from the function. The identifying features may be of the same format as standardized processing characteristic values. In addition, the identifying features of the function may be compared against standardized processing characteristic values associated with a processing statement. The third model may use a predictive model to compare the first set of identifying features against the first standardized processing characteristic. The predictive model (e.g., a linear regression algorithm) may output a numerical value corresponding to a likelihood that the processing statement corresponds to the function.

At step 282, the system performs model inference on the third model. For example, the third model may be applied to an inference dataset. The inference dataset may be of the same format as the training dataset. The desired output for the inference dataset may be known. The system may compare the output of the third model on the inference dataset against the desired output as a means of assessing model quality.

At step 284, the system may post-process the third model in a manner similar to step 222. At step 286, similarly to step 224, the system may determine to retrain the third model in response to receiving retraining data. In some embodiments, the system may choose to retrain the third model only when its output on inference data is sufficiently different from the desired output by the inference data.

Figure 3A:
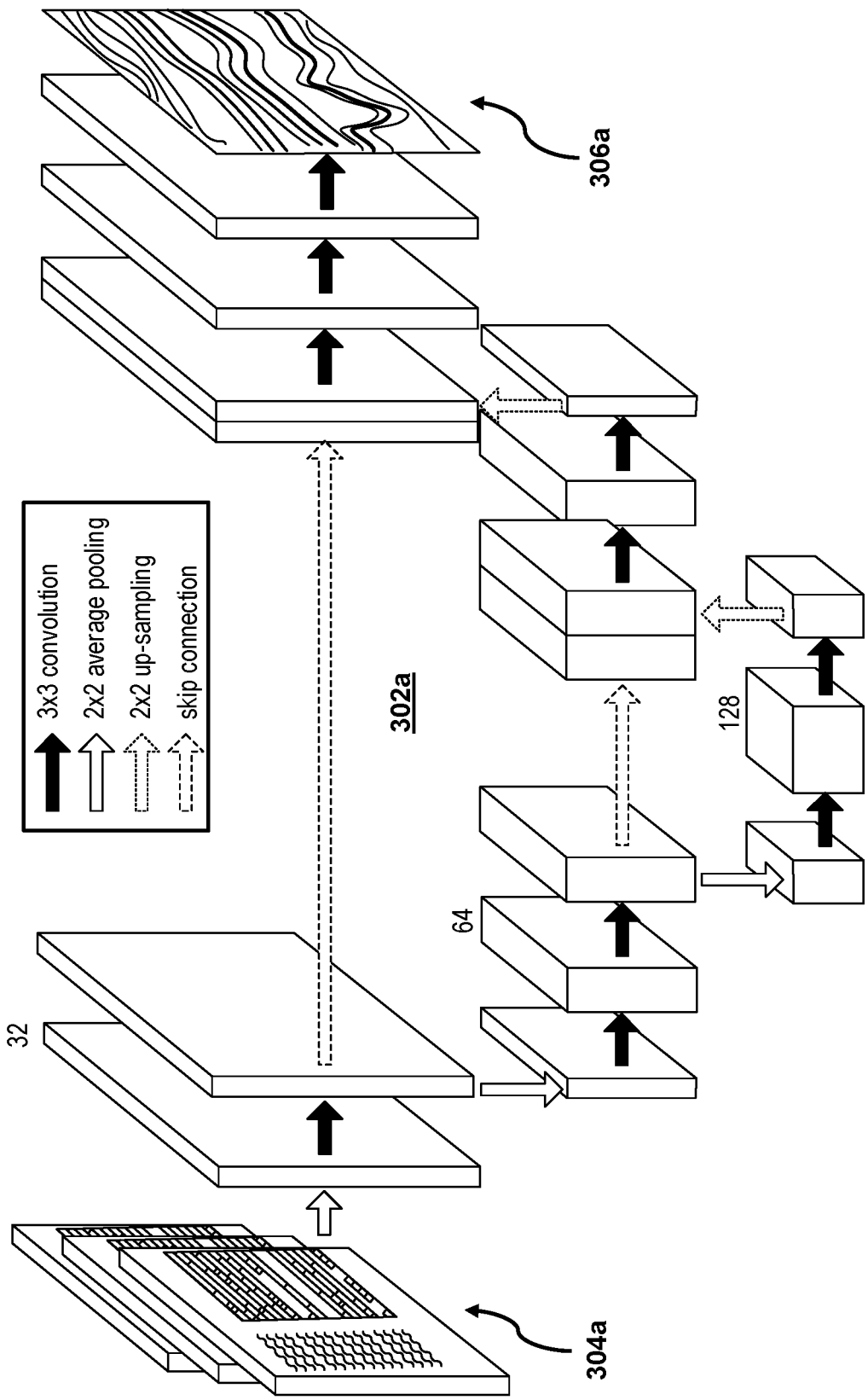
FIGS. 3A-B show illustrative components for a system used to synchronize processing statement deployment with a three-tiered artificial intelligence architecture, in accordance with one or more embodiments.

FIG. 3A shows illustrative components for a system used to synchronize processing statement deployment with a three-tiered artificial intelligence architecture, in accordance with one or more embodiments. For example, FIG. 3A may show illustrative components for the three-tiered artificial intelligence architecture. As shown in FIG. 3A, system 300 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system and may feature one or more component devices. It should be noted that while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3A also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 300 also includes API layer 350. API layer 350 may allow the system to generate summaries across different devices. In some embodiments, API layer 350 may be implemented on user device 322 or user terminal 324. Alternatively, or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is a strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDOS protection, and API layer 350 may use RESTful APIs as standard for external integration.

System 300 also includes model 302a, which may be a machine learning model, artificial intelligence model, etc. (which may be referred to collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., the multinomial classification algorithm of the third model).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306a. In some embodiments, the model (e.g., model 302a) may not perform any actions. The output of the model (e.g., model 302a) may be used to assign one or more categories to a function corresponding to processing statements.

Figure 3B:
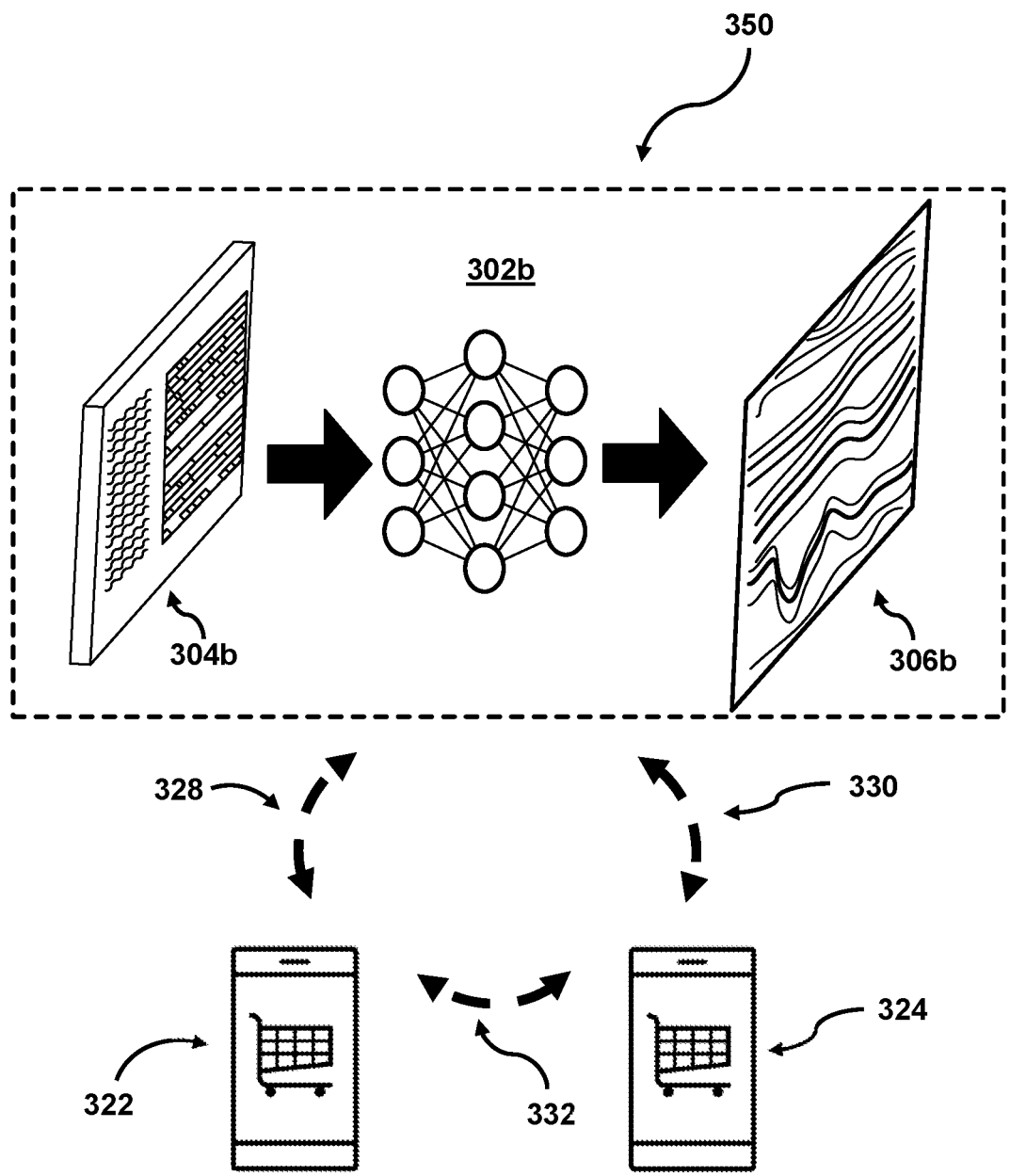

As shown in FIG. 3B, in some embodiments, model 302b may be trained by taking inputs 304b and providing outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem-solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, backpropagation techniques may be utilized by model 302b, where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., the multinomial classification algorithm of the third model).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also, as shown, model 302b may comprise fully connected layers that connect every neuron in one layer to every neuron in another layer.

Figure 4:
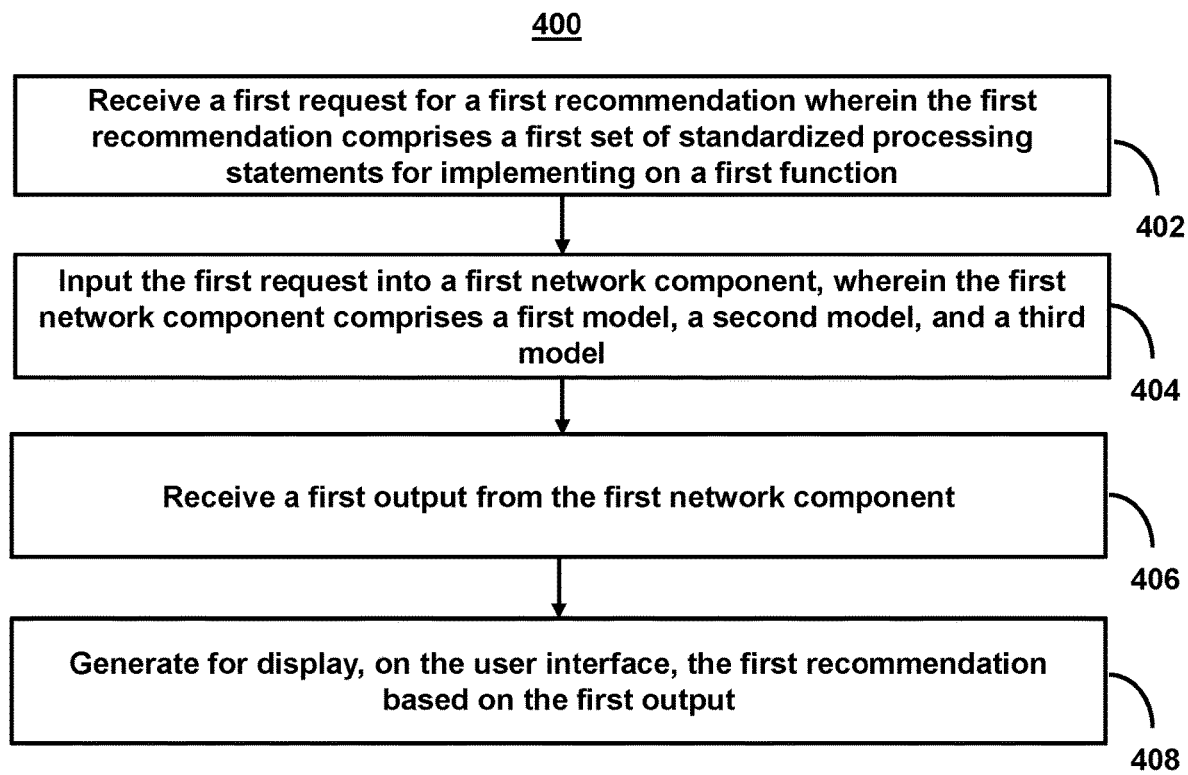
FIG. 4 shows a flowchart of the steps involved in synchronizing processing statement deployment with a three-tiered artificial intelligence architecture, in accordance with one or more embodiments.

FIG. 4 shows a flowchart of the steps involved in using a three-tiered artificial intelligence architecture for synchronizing processing statement deployment, in accordance with one or more embodiments. For example, the system may use process 400 (e.g., as implemented on one or more system components described above) in order to synchronize processing statement deployment with a three-tiered artificial intelligence architecture.

At step 402, process 400 (e.g., using one or more components described above) receives a first request for a first recommendation wherein the first recommendation comprises a first set of standardized processing statements for implementing on a first function. For example, the system may receive, at a user interface, a first request for a first recommendation, wherein the first recommendation comprises a first set of standardized processing statements for implementing a first function of a plurality of functions for a network. For example, the system may receive a request for a set of standardized processing statements that correspond to one or more functions (e.g., business processes) of a given entity. The processing statements may comprise information used for basic information-gathering. For example, the processing statement may comprise answers to who (e.g., what function, entity, system, etc.) a statement applies, what conditions (e.g., as defined by one or more processing characteristics and/or values thereof) are required by the statement, when or where the conditions apply (e.g., in terms of functions, entities, components, etc. that are subject to the statement as well as geographic, temporal, and/or other restrictions used to identify a subset of functions, entities, components, etc.), and/or why a statement exist (e.g., a description of the importance, role, and/or rationale for the statement). For example, a function may describe an action taken by an entity, component, etc., which may comprise a business process performed by a network (which may itself comprise and/or correspond to an entity, component, etc.). For example, processing statements corresponding to a function may define aspects of the function's security, benchmark performance in one or more tasks, or other metrics against which the function may be held. By providing standardizing processing statements to correspond with functions, the system affords a uniform method for contrasting functions, holding functions up to performance standards as needed by organizational requirements, and selecting functions that suit the demands of particular situations.

At step 404, process 400 (e.g., using one or more components described above) inputs the first request into a first network component, wherein the first network component comprises a first model, a second model, and a third model. Prior to training or using the first, second, and third models, the system may perform data cleaning on the text of non-standardized descriptions of non-standardized processing statements. For example, the system may apply one or more data cleaning processes to the non-standardized processing statements. For example, a first data cleaning process may remove stop words, punctuations, and digits from non-standardized descriptions of non-standardized processing statements. For example, a second data cleaning process removes trailing and leading spaces and converts to lowercase all alphanumeric characters; a third data cleaning process lemmatizes each word in non-standardized descriptions of non-standardized processing statements to a root form, and a fourth performs part-of-speech tagging to each word in non-standardized descriptions of non-standardized processing statements. After applying the data cleaning processes to non-standardized descriptions of non-standardized processing statements, the system may generate a set of cleaned non-standardized processing statements. By doing so, the system affords uniformity and reliability to the training of the three machine learning models, ensuring the accuracy and replicability of results.

The first model may be trained to generate a library of standardized processing statements for the plurality of functions based on similarities in non-standardized processing characteristics in non-standardized descriptions of non-standardized processing statements. In order to generate the library of standardized processing statements, the first model may determine distance measures (e.g., cosine similarities) of text of the non-standardized processing characteristics in the non-standardized descriptions of non-standardized processing statements. For example, similar or identical portions of text in the non-standardized descriptions of non-standardized processing statements may be assigned smaller distance measures than portions of text with larger discrepancies. Then, using a distance-based clustering algorithm on the cosine similarities of text of the non-standardized processing characteristics, the first model may cluster the non-standardized processing characteristics into a plurality of standard clusters.

Each standard cluster contains non-standardized processing characteristics with similar text descriptions, thus indicating that the underlying non-standardized processing statements may be the same or sufficiently similar such that they may be grouped into the same standardized processing statement. The distance-based clustering algorithm used by the first model may be one of K-means clustering, hierarchical clustering, DBSCAN, or mean shift clustering. In some embodiments, each standard cluster may be collapsed into a single point at the center of the standard cluster. The point, which may be referred to as a standard archetype, may represent non-standardized processing characteristics for all non-standardized processing statements in the standard cluster. In some embodiments, the standard archetype for a standard cluster may be computed by taking distance-weighted averages of non-standardized processing characteristics in that cluster. For each standard cluster, the standard processing characteristics of the standard archetype may be used to select a standardized processing statement corresponding to that standard cluster. For example, for each cluster in the plurality of standard clusters, the first model may select a standardized processing statement to be a non-standardized processing statement whose non-standardized processing characteristics are closest to the standard archetype of that cluster. Thus, the first model may generate a library of standardized processing statements for the plurality of functions. Functions within the plurality of functions may be labeled with one or more standardized processing statements from the library, e.g., using the second and third models. By combining non-standardized processing statements into standardized processing statements using clustering of non-standardized processing characteristics, the system reduces redundancy in data, increases uniformity, and creates more accurate predictions in downstream tasks.

The second model may be trained to generate a plurality of standardized processing characteristic values for each standardized processing statement in the library. For example, the system may generate a feature input for the second model based on each standardized processing statement in the library. A feature input may correspond to or include a plurality of text segments. Each text segment in the plurality of text segments comprises one or more words and punctuation marks in a standardized processing statement in the library. Using the text segments, the system may generate text paragraphs. Each text paragraph comprises one or more words, sentences, and punctuation marks in a standardized processing statement in the library. That is, the system may divide text in the descriptions of standardized processing statements into portions of varying sizes. The system may then string together the portions of text in sequence and generate the feature input for the second model to include text segments and text paragraphs. By preparing the feature input of the second model this way, the system allows the second model to make use of contextual cues as well as standalone interpretations within the text data and achieve a more accurate embedding for words, phrases, and sentences.

The second model may input the feature input into a transformer-based model and/or a natural language processing model. The natural language processing model may use Levenshtein Distance or other distance metrics to calculate differences between one or more sequences and patterns of text in standardized processing statements. In some embodiments, the natural language processing model may be a rule-based model like the NLTK library. For example, the natural language processing model may perform preprocessing for the transformer-based model. The transformer-based model may, for example, be a BERT model or another language model. The system may receive as output from the transformer-based model and/or the natural language processing model a plurality of text representations for standardized processing statements. A text representation may be a vector of real values corresponding to a segment of text (e.g., the feature input to the transformer-based model and/or a natural language processing model). Each standardized processing statement may correspond to one or more text representations. Using the plurality of text representations, the second model may generate a plurality of standardized processing characteristic values for each standardized processing statement in the library. The standardized processing characteristic values may include a list of text representations corresponding to the standardized processing statement, as generated by the second model. By using text representations to inform standardized processing characteristic values, the second model provides a uniform and informative method for comparing standardized processing statements.

The third model is trained to generate recommendations of sets of standardized processing statements applied to one or more of the plurality of functions. For example, the system may generate a feature input for the third model based on each standardized processing statement in the library (e.g., as generated by the first model). In some embodiments, the feature input corresponding to a standardized processing statement in the library may include the text representations as generated by the second model. The third model may then input the feature input into a classification model (e.g., a multinomial logistic regression algorithm) to receive as output a plurality of category assignments. Each standardized processing statement in the library may be assigned with one or more categories from a set of categories. The third model may correspondingly generate an equivalence map from the set of categories to the plurality of functions. The equivalence map may be used in two directions: for a given function, the equivalence map may output the set of categories the function is assigned to; for a given category, the equivalence map may output the set of functions to which the category has been assigned. By doing so, the system may synchronize the functions to which one or more standardized processing statements are deployed. This synchronization may also be dynamically updated as new functions, processing statements in the standardized library, and/or the function taxonomy is updated.

In some embodiments, the third model may instead process the function to extract identifying features from the function. The identifying features may be of the same format as standardized processing characteristic values. In addition, the identifying features of the function may be compared against standardized processing characteristic values associated with a processing statement. The third model may use a predictive model to compare the first set of identifying features against the first standardized processing characteristic. The predictive model (e.g., a linear regression algorithm) may output a numerical value corresponding to a likelihood that the processing statement corresponds to the function.

In some embodiments, the system may receive retraining data. For example, the retraining data may contain a second set of standardized processing statements and a second plurality of functions, as distinct from the first set of standardized processing statements and the first plurality of functions. The system may use the retraining data to retrain the first model to generate a second library of standardized processing statements for the plurality of functions based on cosine similarities of text of non-standardized processing characteristics in non-standardized descriptions of non-standardized processing statements. Similarly, the system may use the retraining data to retrain the second model to generate a second plurality of standardized processing characteristic values for each standardized processing statement in the second library. The system may use the retraining data to retrain the third model to generate recommendations of sets of standardized processing statements from the second set of standardized processing statements applied to one or more of the second plurality of functions. By retraining the three models in response to additional data, the system may continuously update the available standardized processing statements as new entities, functions, etc. are created and/or removed, dynamically update processing characteristic values as new requirements and/or goals for processing characteristic values are determined and/or implemented, and dynamically update the synchronization of functions to standardized processing statements as new functions, processing statements in the standardized library, and/or the function taxonomy is updated.

At step 406, process 400 (e.g., using one or more components described above) receives a first output from the first network component. The system may, for example, determine a first likelihood that a first processing statement in the first set of standardized processing statements corresponds to the first function (e.g., using the third model). In some embodiments, the system may filter the standardized processing statements in the library based on a likelihood that a given processing statement corresponds to a given function. The system may determine such likelihoods for a plurality of standardized processing statements, for example, by comparing each of the likelihoods to a threshold likelihood. The system may, for example, select three standardized processing statements that each have a likelihood computed by the third model to exceed 0.7 (the likelihood threshold). Therefore, the system may select to include the three processing statements in the first set of standardized processing statements in the recommendation provided to the user. In some embodiments, the system may generate for display a confidence level that a given processing statement corresponds to a given function. The confidence level may comprise a qualitative or quantitative description of a likelihood that a given processing statement corresponds to a given function. In some embodiments, the system may determine, based on the first output, a respective confidence level that each processing statement in the first set of standardized processing statements corresponds to the first function. The confidence levels may correspond to the system's certainty that the likelihood accurately estimates the match between the first function and a standardized processing statement. Confidence levels may be derived from the training or cross-validation errors of the third model. The system may provide the respective confidence levels in the first recommendation. By doing so, the system not only provides the most pertinent processing statements that describe the function but the system also provides a comprehensive comparison of the processing statements to inform the user's selection.

At step 408, process 400 (e.g., using one or more components described above) generates for display, on the user interface, the first recommendation based on the first output.

For example, the first recommendation may include a first set of standardized processing statements for implementing on a function of a plurality of functions for a network. Additionally, or alternatively, the system may include additional information that may describe a quantitative or qualitative characteristic of a processing statement, function, etc. For example, the system may determine, based on the first output, a respective processing description for each processing statement in the first set of standardized processing statements corresponds to the first function, and provide the respective processing description in the first recommendation. In some embodiments, the system may provide a processing description for each processing statement in the first set of standardized processing statements. For example, the processing statement may describe one or more processing characteristics and/or processing characteristic values thereof for a given processing statement. By doing so, the system may provide a unified, uniform, and reliable framework for describing, monitoring, and controlling functions.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:
1. A method, the method comprising receiving, at a user interface, a first request for a first recommendation, wherein the first recommendation comprises a first set of standardized processing statements for implementing on a first function of a plurality of functions for a network; inputting the first request into a first network component, wherein the first network component comprises a first model, a second model, and a third model, wherein: the first model is trained to generate a library of standardized processing statements for the plurality of functions based on similarities in non-standardized processing characteristics in non-standardized descriptions of non-standardized processing statements; the second model is trained to generate a plurality of standardized processing characteristic values for each standardized processing statement in the library; and the third model is trained to generate recommendations of sets of standardized processing statements applied to one or more of the plurality of functions; and receiving a first output from the first network component; and generating for display, on the user interface, the first recommendation based on the first output.
2. The method of any one of the preceding embodiments, wherein receiving the first output from the first network component further comprises: determining a first likelihood that a first processing statement in the first set of standardized processing statements corresponds to the first function; comparing the first likelihood to a threshold likelihood; and based on comparing the first likelihood to the threshold likelihood, selecting to include the first processing statement in the first set of standardized processing statements.
3. The method of any one of the preceding embodiments, wherein generating for display the first recommendation based on the first output further comprises: determining, based on the first output, a respective confidence level that each processing statement in the first set of standardized processing statements corresponds to the first function; and providing the respective confidence level in the first recommendation.
4. The method of any one of the preceding embodiments, wherein generating for display the first recommendation based on the first output further comprises: determining, based on the first output, a respective processing description for each processing statement in the first set of standardized processing statements corresponds to the first function; and providing the respective processing description in the first recommendation.
5. The method of any one of the preceding embodiments, wherein generating a library of standardized processing statements further comprises: determining cosine similarities of text of the non-standardized processing characteristics in the non-standardized descriptions of non-standardized processing statements; and using a distance-based clustering algorithm on the cosine similarities of text of the non-standardized processing characteristics, clustering the non-standardized processing characteristics into a plurality of standard clusters.
6. The method of any one of the preceding embodiments, further comprising: for each cluster in the plurality of standard clusters, generating a standard archetype corresponding to that cluster by taking distance-weighted averages of non-standardized processing characteristics in that cluster; for each cluster in the plurality of standard clusters, selecting a standardized processing statement to be a non-standardized processing statement whose non-standardized processing characteristics is closest to the standard archetype of that cluster; and generating the library of standardized processing statements for the plurality of functions.
7. The method of any one of the preceding embodiments, further comprising: generating a feature input for the second model based on each standardized processing statement in the library; inputting the feature input into a transformer-based model and a natural language processing model, wherein the natural language processing model uses Levenshtein Distance to calculate differences between one or more sequences and patterns of text in standardized processing statements; receiving, as output from the transformer-based model and the natural language processing model, a plurality of text representations for standardized processing statements; and using the plurality of text representations, generating the plurality of standardized processing characteristic values for each standardized processing statement in the library.
8. The method of any one of the preceding embodiments, wherein generating the feature input for the second model comprises: generating a plurality of text segments, wherein each text segment in the plurality of text segments comprises one or more words and punctuation marks in a standardized processing statement in the library; based on the plurality of text segments, generating a plurality of text paragraphs, wherein each text paragraph in the plurality of text paragraphs comprises one or more words, sentences, and punctuation marks in a standardized processing statement in the library; and generating the feature input for the second model, wherein the feature input comprises the plurality of text segments and the plurality of text paragraphs.

9. The method of any one of the preceding embodiments, further comprising: generating a feature input for the third model based on each standardized processing statement in the library; inputting the feature input into a classification model, wherein the classification model uses a multinomial logistic regression algorithm; receiving as output from the classification model a plurality of category assignments, wherein each standardized processing statement in the library is assigned with one or more categories from a set of categories; and generating an equivalence map from the set of categories to the plurality of functions.

10. The method of any one of the preceding embodiments, wherein determining the first likelihood that the first processing statement in the first set of standardized processing statements corresponds to the first function comprising: extracting a first set of identifying features from a first function; using a predictive model, comparing the first set of identifying features against first standardized processing characteristic values associated with the first processing statement; and receiving, as output from the predictive model, a numerical value corresponding to the first likelihood.

11. The method of any one of the preceding embodiments, further comprising: receiving retraining data, wherein the retraining data comprises a second set of standardized processing statements and a second plurality of functions; based on the retraining data, retraining the first model to generate a second library of standardized processing statements for the plurality of functions based on cosine similarities of text of non-standardized processing characteristics in non-standardized descriptions of non-standardized processing statements; based on the retraining data, retraining the second model to generate a second plurality of standardized processing characteristic values for each standardized processing statement in the second library; and based on the retraining data, retraining the third model to generate recommendations of sets of standardized processing statements from the second set of standardized processing statements applied to one or more of the second plurality of functions.

12. The method of any one of the preceding embodiments, further comprising: applying a first data cleaning process to non-standardized descriptions of non-standardized processing statements, wherein the first data cleaning process removes stop words, punctuations, and digits from non-standardized descriptions of non-standardized processing statements; and applying a second data cleaning process to non-standardized descriptions of non-standardized processing statements, wherein the second data cleaning process removes trailing and leading spaces and converts to lowercase all alphanumeric characters in non-standardized descriptions of non-standardized processing statements; applying a third data cleaning process to non-standardized descriptions of non-standardized processing statements, wherein the third data cleaning process lemmatizes each word in non-standardized descriptions of non-standardized processing statements to a root form; applying a fourth data cleaning process to non-standardized descriptions of non-standardized processing statements, wherein the fourth data cleaning process performs part-of-speech tagging to each word in non-standardized descriptions of non-standardized processing statements; based on applying the first, second, third, and fourth data cleaning processes to non-standardized descriptions of non-standardized processing statements, generating a set of cleaned non-standardized processing statements.

13. The method of any one of the preceding embodiments, further comprising: inputting the set of cleaned non-standardized processing statements to the first model to receive as output a library of standardized processing statements; inputting the set of cleaned non-standardized processing statements to the second model to receive as output a standardized set of processing characteristic values; and inputting the set of cleaned non-standardized processing statements to the third model to receive as output a set of likelihoods that each cleaned non-standardized processing statement in the set of cleaned non-standardized processing statements corresponds to the first function.

14. A tangible, non-transitory, computer-readable medium storing instructions that, when executed by a data processing apparatus, cause the data processing apparatus to perform operations comprising those of any of embodiments 1-13.

15. A system comprising one or more processors; and memory-storing instructions that, when executed by the processors, cause the processors to effectuate operations comprising those of any of embodiments 1-13.

16. A system comprising means for performing any of embodiments 1-13.

What is claimed is:

1. A system for synchronizing processing statement deployment in Activity, Risk, Control, and Monitoring ("ARCM") tools using a three-tiered artificial intelligence architecture, the system comprising:
one or more processors; and
a non-transitory, computer-readable medium, comprising instructions that, when executed by the one or more processors, cause operations comprising:
receiving, at a user interface, a first request for a first recommendation, wherein the first recommendation comprises a first set of standardized processing statements for implementing on a first function of a plurality of functions for a network;
inputting the first request into a first network component, wherein the first network component comprises a plurality of models, wherein one or more of the plurality of models is trained to:
generate a library of standardized processing statements for the plurality of functions based on cosine similarities of text of non-standardized processing characteristics in non-standardized descriptions of non-standardized processing statements;
generate a plurality of standardized processing characteristic values for each standardized processing statement in the library, wherein the one or more of the plurality of models comprises a transformer-based model and a natural language processing model; and
generate recommendations of sets of standardized processing statements applied to one or more of the plurality of functions, wherein the one or more of the plurality of models comprises a classification model; and
receiving a first output from the one or more of the plurality of models, wherein the first output comprises the first set of standardized processing statements for implementing on the first function of the plurality of functions for the network.

2. A method for synchronizing processing statement deployment across diverse computer networks using a three-tiered artificial intelligence architecture, the method comprising:
  receiving, at a user interface, a first request for a first set of standardized processing statements for implementing on a first function of a plurality of functions for a network;
  inputting the first request into a first network component, wherein the first network component comprises a plurality of models, wherein one or more of the plurality of models is trained to:
    generate a library of standardized processing statements for the plurality of functions based on similarities in non-standardized processing characteristics in non-standardized descriptions of non-standardized processing statements;
    generate a plurality of standardized processing characteristic values for each standardized processing statement in the library; and
    generate recommendations of sets of standardized processing statements applied to one or more of the plurality of functions; and
  receiving a first output from the first network component comprising the first set of standardized processing statements for implementing on the first function of the plurality of functions for the network.

3. The method of claim 2, wherein receiving the first output from the first network component further comprises:
  determining a first likelihood that a first processing statement in the first set of standardized processing statements corresponds to the first function;
  comparing the first likelihood to a threshold likelihood; and
  based on comparing the first likelihood to the threshold likelihood, selecting to include the first processing statement in the first set of standardized processing statements.

4. The method of claim 2, further comprising:
  generating for display a first recommendation based on the first output by:
    determining, based on the first output, a respective confidence level that each processing statement in the first set of standardized processing statements corresponds to the first function; and
    providing the respective confidence level in the first recommendation.

5. The method of claim 2, further comprising:
  generating for display a first recommendation based on the first output by:
    determining, based on the first output, a respective processing description for each processing statement in the first set of standardized processing statements corresponds to the first function; and
    providing the respective processing description in the first recommendation.

6. The method of claim 2, wherein generating the library of standardized processing statements further comprises:
  determining cosine similarities of text of the non-standardized processing characteristics in the non-standardized descriptions of non-standardized processing statements; and
  using a distance-based clustering algorithm on the cosine similarities of text of the non-standardized processing characteristics, clustering the non-standardized processing characteristics into a plurality of standard clusters.

7. The method of claim 6, further comprising:
  for each cluster in the plurality of standard clusters, generating a standard archetype corresponding to that cluster by taking distance-weighted averages of non-standardized processing characteristics in that cluster;
  for each cluster in the plurality of standard clusters, selecting a standardized processing statement to be a non-standardized processing statement whose non-standardized processing characteristics are closest to the standard archetype of that cluster; and
  generating the library of standardized processing statements for the plurality of functions.

8. The method of claim 2, further comprising:
  generating a feature input for the plurality of models based on each standardized processing statement in the library;
  inputting the feature input into a transformer-based model and a natural language processing model, wherein the natural language processing model uses Levenshtein Distance to calculate differences between one or more sequences and patterns of text in standardized processing statements;
  receiving, as output from the transformer-based model and the natural language processing model, a plurality of text representations for standardized processing statements; and
  using the plurality of text representations, generating the plurality of standardized processing characteristic values for each standardized processing statement in the library.

9. The method of claim 8, wherein generating the feature input for the plurality of models comprises:
  generating a plurality of text segments, wherein each text segment in the plurality of text segments comprises one or more words and punctuation marks in a standardized processing statement in the library;
  based on the plurality of text segments, generating a plurality of text paragraphs, wherein each text paragraph in the plurality of text paragraphs comprises one or more words, sentences, and punctuation marks in a standardized processing statement in the library; and
  generating the feature input for the plurality of models, wherein the feature input comprises the plurality of text segments and the plurality of text paragraphs.

10. The method of claim 2, further comprising:
  generating a feature input for the plurality of models based on each standardized processing statement in the library;
  inputting the feature input into a classification model, wherein the classification model uses a multinomial logistic regression algorithm;
  receiving as output from the classification model a plurality of category assignments, wherein each standardized processing statement in the library is assigned with one or more categories from a set of categories; and
  generating an equivalence map from the set of categories to the plurality of functions.

11. The method of claim 3, wherein determining the first likelihood that the first processing statement in the first set of standardized processing statements corresponds to the first function comprising:
  extracting a first set of identifying features from a first function;
  using a predictive model, comparing the first set of identifying features against first standardized processing characteristic values associated with the first processing statement; and receiving, as output from the predictive model, a numerical value corresponding to the first likelihood.

12. The method of claim 2, further comprising:
receiving retraining data, wherein the retraining data comprises a second set of standardized processing statements and a second plurality of functions;
based on the retraining data, retraining the one or more of the plurality of models to generate a second library of standardized processing statements for the plurality of functions based on cosine similarities of text of non-standardized processing characteristics in non-standardized descriptions of non-standardized processing statements;
based on the retraining data, retraining the one or more of the plurality of models to generate a second plurality of standardized processing characteristic values for each standardized processing statement in the second library; and
based on the retraining data, retraining the one or more of the plurality of models to generate recommendations of sets of standardized processing statements from the second set of standardized processing statements applied to one or more of the second plurality of functions.

13. The method of claim 2, further comprising:
applying a first data cleaning process to non-standardized descriptions of non-standardized processing statements, wherein the first data cleaning process removes stop words, punctuations, and digits from non-standardized descriptions of non-standardized processing statements;
applying a second data cleaning process to non-standardized descriptions of non-standardized processing statements, wherein the second data cleaning process removes trailing and leading spaces and converts to lowercase all alphanumeric characters in non-standardized descriptions of non-standardized processing statements;
applying a third data cleaning process to non-standardized descriptions of non-standardized processing statements, wherein the third data cleaning process lemmatizes each word in non-standardized descriptions of non-standardized processing statements to a root form;
applying a fourth data cleaning process to non-standardized descriptions of non-standardized processing statements, wherein the fourth data cleaning process performs part-of-speech tagging to each word in non-standardized descriptions of non-standardized processing statements; and
based on applying the first, second, third, and fourth data cleaning processes to non-standardized descriptions of non-standardized processing statements, generating a set of cleaned non-standardized processing statements.

14. The method of claim 13, further comprising:
inputting the set of cleaned non-standardized processing statements to the one or more of the plurality of models to receive as output a library of standardized processing statements;
inputting the set of cleaned non-standardized processing statements to the one or more of the plurality of models to receive as output a standardized set of processing characteristic values; and
inputting the set of cleaned non-standardized processing statements to the one or more of the plurality of models to receive as output a set of likelihoods that each cleaned non-standardized processing statement in the set of cleaned non-standardized processing statements corresponds to the first function.

15. A non-transitory, computer-readable medium comprising instructions that, when executed by one or more processors, cause operations comprising:
receiving, at a user interface, a first request for a first set of standardized processing statements for implementing on a first function of a plurality of functions for a network;
inputting the first request into a first network component, wherein the first network component comprises a plurality of models, wherein one or more of the plurality of models is trained to:
generate a library of standardized processing statements for the plurality of functions based on similarities in non-standardized processing characteristics in non-standardized descriptions of non-standardized processing statements;
generate a plurality of standardized processing characteristic values for each standardized processing statement in the library; and
generate recommendations of sets of standardized processing statements applied to one or more of the plurality of functions; and
receiving a first output from the first network component comprising the first set of standardized processing statements for implementing on the first function of the plurality of functions for a network.

16. The non-transitory, computer-readable medium of claim 15, wherein receiving the first output from the first network component further comprises:
determining a first likelihood that a first processing statement in the first set of standardized processing statements corresponds to the first function;
comparing the first likelihood to a threshold likelihood; and
based on comparing the first likelihood to the threshold likelihood, selecting to include the first processing statement in the first set of standardized processing statements.

17. The non-transitory, computer-readable medium of claim 15, further comprising:
generating for display a first recommendation based on the first output by:
determining, based on the first output, a respective confidence level that each processing statement in the first set of standardized processing statements corresponds to the first function; and
providing the respective confidence level in the first recommendation.

18. The non-transitory, computer-readable medium of claim 15, wherein generating the library of standardized processing statements further comprises:
determining cosine similarities of text of the non-standardized processing characteristics in the non-standardized descriptions of non-standardized processing statements;
using a distance-based clustering algorithm on the cosine similarities of text of the non-standardized processing characteristics, clustering the non-standardized processing characteristics into a plurality of standard clusters;
for each cluster in the plurality of standard clusters, generating a standard archetype corresponding to that cluster by taking distance-weighted averages of non-standardized processing characteristics in that cluster;

for each cluster in the plurality of standard clusters, selecting a standardized processing statement to be a non-standardized processing statement whose non-standardized processing characteristics are closest to the standard archetype of that cluster; and generating the library of standardized processing statements for the plurality of functions.

19. The non-transitory, computer-readable medium of claim 15, further comprising:

generating a feature input for the plurality of models based on each standardized processing statement in the library;

inputting the feature input into a transformer-based model and a natural language processing model, wherein the natural language processing model uses Levenshtein Distance to calculate differences between one or more sequences and patterns of text in standardized processing statements;

receiving, as output from the transformer-based model and the natural language processing model, a plurality of text representations for standardized processing statements; and using the plurality of text representations, generating the plurality of standardized processing characteristic values for each standardized processing statement in the library.

20. The non-transitory, computer-readable medium of claim 15, further comprising:

generating a feature input for the plurality of models based on each standardized processing statement in the library;

inputting the feature input into a classification model, wherein the classification model uses a multinomial logistic regression algorithm;

receiving as output from the classification model a plurality of category assignments, wherein each standardized processing statement in the library is assigned with one or more categories from a set of categories; and generating an equivalence map from the set of categories to the plurality of functions.

* * * * *